Aug. 21, 1951
A. BESAG ET AL
2,565,165
FRUIT PITTING MACHINE
Filed March 3, 1947
5 Sheets-Sheet 3
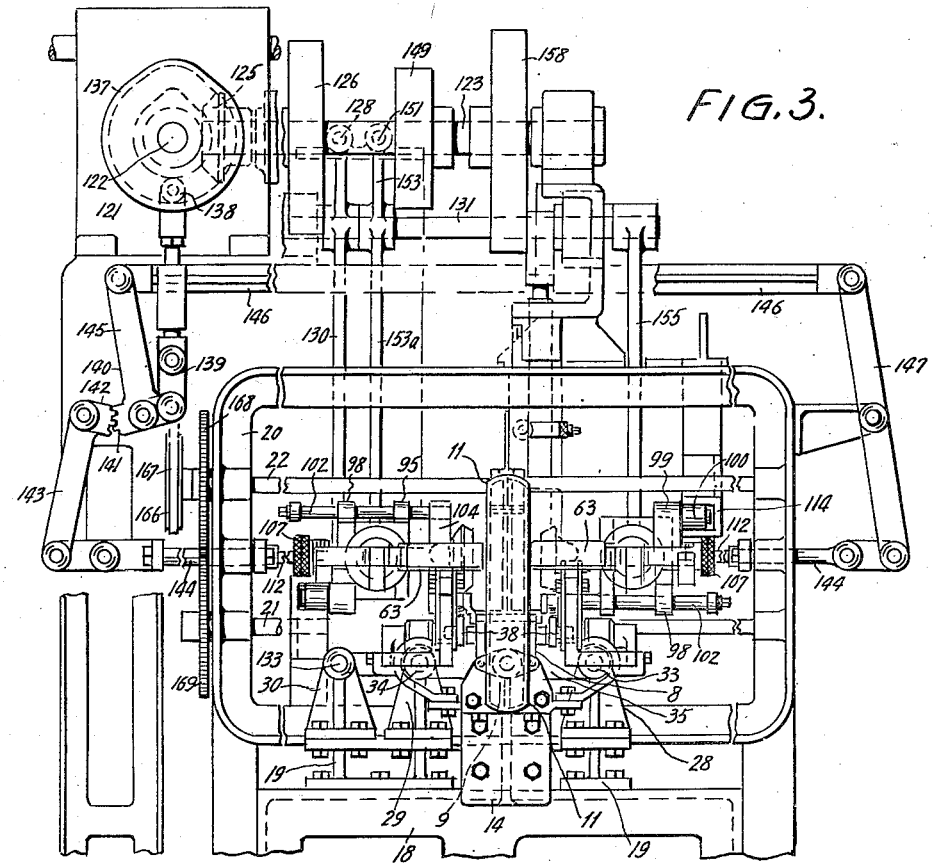
FIG. 3.
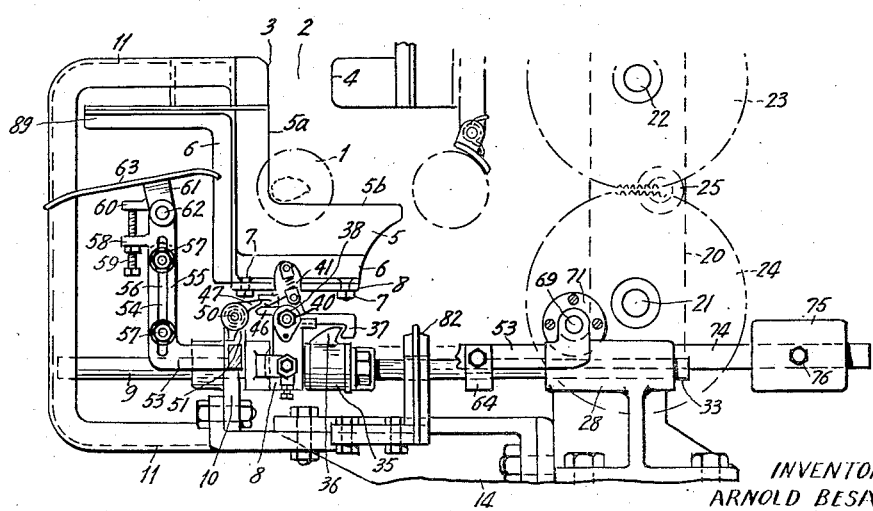
FIG. 5.
INVENTORS
ARNOLD BESAG &
JAMES SHELDON MOSS
BY
ATTORNEYS INVENTORS
ARNOLD BESAG &
JAMES SHELDON MOSS
BY Richards & Geier
ATTORNEYS

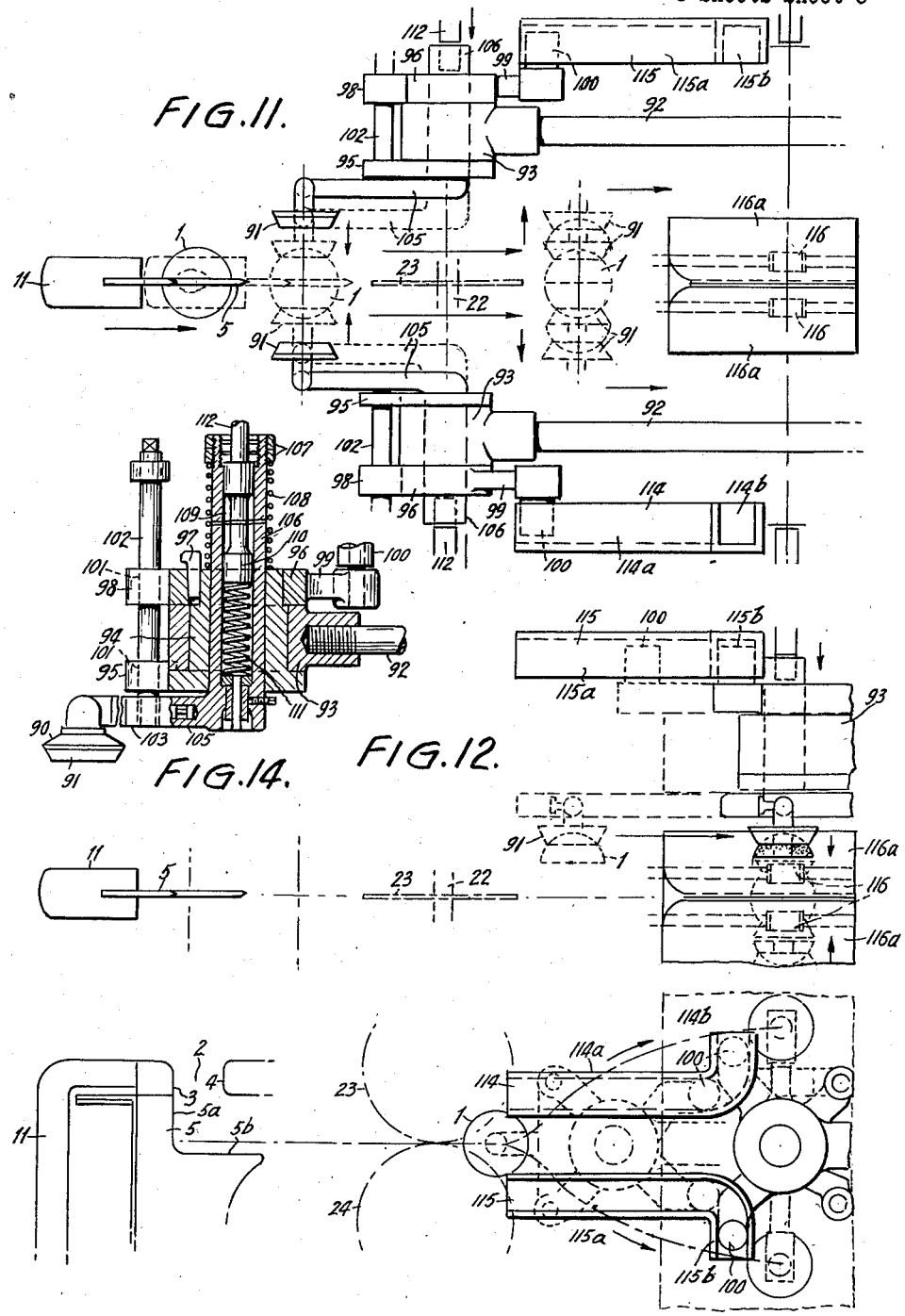

Patented Aug. 21, 1951

2,565,165

UNITED STATES PATENT OFFICE 2,565,165

FRUIT PITTING MACHINE

Arnold Besag, East Malvern, Victoria, and James Sheldon Moss, Spotswood, Victoria, Australia Application March 3, 1947, Serial No. 731,996
In Australia March 14, 1946

13 Claims. (Cl. 146—28)

This invention relates to machines for pitting peaches and like dupraceous fruits.

In known types of fruit pitting machines feeding means for the fruit usually comprise some type of impaling blade on which the operator impales the fruit with the suture and stem cavity of the fruit located in a predetermined manner on the impaling blade. The impaling blades are stationary before and during positioning of the fruit by the operator and the machine is started by trip mechanism actuated manually or pedally by the operator.

In this method of feeding the fruit it is apparent that care is required by the operator in not starting the machine until both hands are clear of the fruit. In one known machine the arrangement is such that the operator is supposed, after placing a fruit on the impaling blade, to trip the machine with one hand while the other hand picks up the next fruit. However, there is a risk that the one hand of the operator may try to readjust an incorrectly positioned fruit, while the other hand inadvertently and prematurely starts the machine with consequent possibility of the one hand being pulled into the machine or hit by transfer cups, other moving parts of the machine or perhaps the following impaling blade. Therefore this method of starting the machine or part thereof by hand or foot actuation is not without risk of injury to the operator with consequent loss of output. In any event time is lost by the operator in ensuring that both hands are free in addition to the time taken in ensuring that the fruit is correctly located on the feeding means.

The above disadvantages of this type of machine apparently are the reasons for the more general adoption of feeding the fruit onto continuously or intermittently travelling impaling blades. This method of feeding does not involve any loss of time in the operator's feeding movements but has the danger that the sharp impaling blades travel within the scope or field of movement of the operator's hands. Consequently it may frequently happen that a positioned fruit will require subsequent adjustment. It is apparent, then, that the operator should have the opportunity of making such positional adjustment without risking injury by advancing impaling blades. Because of the risk of injury the operator will not make such adjustment and will allow the fruit to pass into the machine which will result in faulty pitting, associated stoppages and possible breakage of pitting knives.

In known machines, after positioning of the fruit on an impaling blade, the fruit is passed to a fruit halving means and then the fruit halves are transferred along oblique parting plates, or swung outwardly in a horizontal plane to pitting stations, which tends to provide cumbersome designs of machines. Furthermore it is usual to place the fruit on the impaling blade in such a manner that the longitudinal axis of the stone is horizontal. Any horizontal movement for parting the fruit halves will therefore necessitate the pitting knife having a motion in which its aperture is swung in a horizontal plane which will frequently cause pits to foul the lower flank of the pitting knife with consequent difficulty in ensuring positive discharge of the pit from the pitting station.

The principal objective of the present invention is to provide a fruit pitting machine having fruit feeding means in which danger of injury to the operator is practically eliminated and at the same time enabling accurate positioning of the fruit by the operator without affecting the output of the machine.

A further objective of the present invention is to provide improved means for transferring the halved fruit to the pitting stations whereby the fruit stones can be conveniently removed, and which moreover, permits the machine to be of small and compact design.

With the above stated principal objective in view, and according to the invention, there is provided a fruit pitting machine, having a movable fruit impaling means, on which fruit is manually impaled at and then conveyed from a fruit feeding position, and control means operable from a normal position in response to the fruit impaling action by an operative while the movable fruit impaling means is at rest at the feeding position, the return movement of said control means upon completion of the manual fruit impaling action initiating movement of the fruit impaling means from said feeding position.

More specifically, there is provided a movable impaling blade to receive fruit at and convey it from a fruit feeding position, impaling blade actuating means to move the impaling blade from and back to the feeding position, and control means operable in response to a manual fruit impaling action by an operative and which effects operative connection of said actuating means with the impaling blade only after completion of the fruit impaling action, whereby the impaling blade remains disconnected from the actuating means and stationary at the feeding position until the completion of the manual impaling action. In this arrangement the impaling blade advances only after the operator's hands are clear of the sharp edges of the blade, and until return of the impaling blade to the feeding position the operator is prevented by the blade holder from attempting to enter another fruit at the feeding position.

With the above stated further objective in view the fruit halves on delivery from halving means are angularly moved in opposite directions and in parallel planes through angles of substantially 90° to relatively spaced pitting stations.

This arrangement enables the longitudinal axis of the fruit stone to be changed to a vertical position, particularly when the fruit is fed, as in usual practice, with the longitudinal axis of the stone in a horizontal plane. Said change of direction of the stone axis permits the aperture of the pitting knife to be operated in a vertical plane whereby the severed stones are able to be freely released from the fruit without fouling the pitting knife.

The invention will be better understood from the following description of the pitting machine depicted in the accompanying drawings.

In these drawings:

Fig. 3 is a front elevation as viewed from the operator's position.

Fig. 4 is a fragmentary detail of the machine.

Figs. 5 and 6 are respectively a side elevation and a plan of the feed mechanism, showing the relative arrangement of the vacuum pick-up means and splitting saws.

Figs. 11, 12 and 13 are diagrammatical views illustrative of the transference of a fruit from the feeding station to the vacuum pick-up means, and to the splitting saws and pitting mechanism.

Fig. 14 is a sectional plan of a vacuum pick-up cup and the associated operative mechanism.

Figure 1:
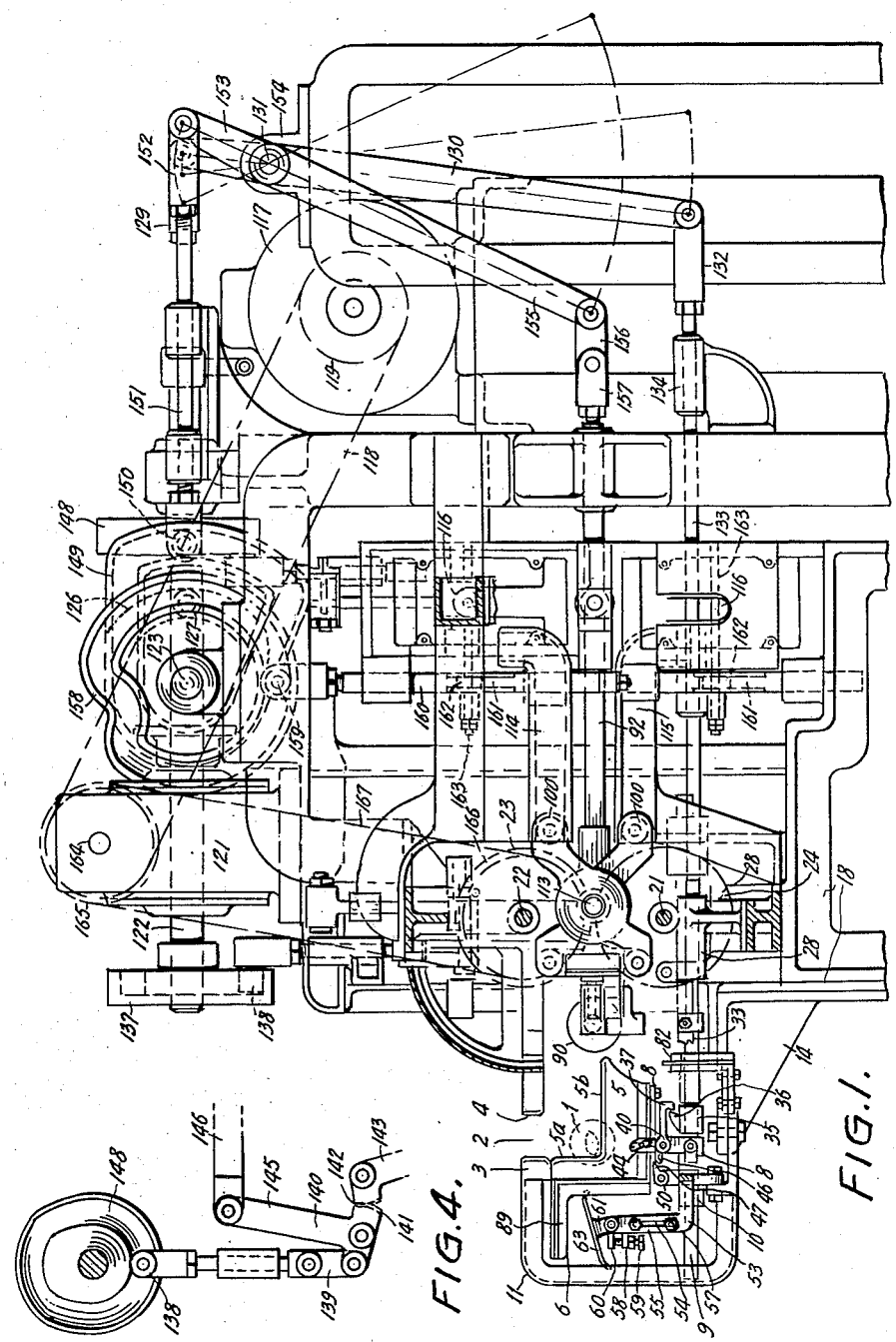
Fig. 1 is a sectional side elevation of the pitting machine.

The machine will be described concurrently with the description of the course and successive operative steps in the processing of an article of fruit in passing through the machine from the feeding position to the final position whereat the pitted fruit is discharged.

Referring in the first instance to Figs. 1 to 7, an article of fruit designated by 1, such as a peach, is inserted by an operative, through the gap, indicated by 2, between two fixed impaling blades 3 and 4 and impaled upon a movable impaling blade 5 having vertical and horizontal blade portions 5a and 5b.

The fruit is positioned at the apex of the blade portions 5a and 5b as shown, and is disposed by the operative with the suture and stem cavity in the usual required position.

The impaling blade 5 is secured to a bracket 6 fixed by bolts 7 to a carriage 8 mounted upon a reciprocable rod or bar 9.

The rod 9 is slidably supported by a bearing bracket 10 bolted to a frame 11 which is extended to shield the movable impaling blade 5 and carry the fixed impaling blade 3.

The frame 11 is secured to a bracket 14 which is fixed to the main supporting frame 18 of the machine whereon is mounted a transverse frame 19 having upward extensions 20, see Fig. 5, in which are rotatably supported the spindles 21 and 22 of slitting saws 23 and 24.

Secured to the transverse frame 19 are bearings 28, and 29, and 30, and in the bearings 28 and 29 are slidably fitted rods 33 and 34 which are secured to a crosshead 35 having thereon upwardly projecting teeth or catches 36, see Fig. 5.

Co-operative as presently described, with the teeth 36 are pawls 37 having integrally formed therewith sleeves or bosses 38 which are rotatably mounted on shafts 40 secured in the carriage 8.

Each pawl 37 is under the influence of a snap over or over centering compression spring 41, the opposite ends of which are engaged with sockets 42 and 43, the latter socket being pivotally connected to a bracket 44 fixed to the carriage 8, whereas the socket 42 is pivotally connected with a lug 45 integral with the sleeve or boss 38 of the pawl 37.

Figure 10:
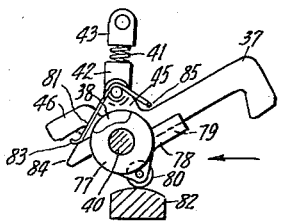
Figs. 8, 9 and 10 are fragmentary details illustrating the actions of a certain part hereinafter described.
Figure 8:
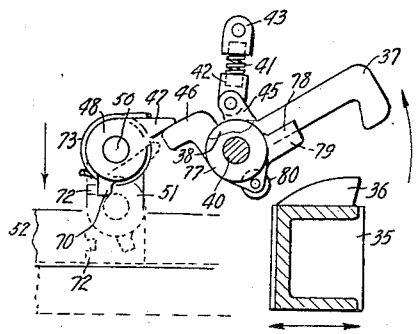
Figure 9:
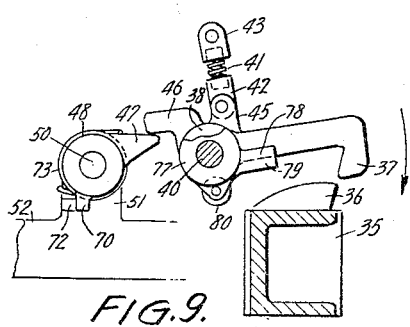

Referring now to Figs. 8, 9 and 10, it will be observed that the pawl 37 will be moved angularly in a downward direction, see Fig. 9, for engagement with the tooth or catch 36 or upwardly and clear of the latter, see Fig. 8, by the snap over spring 41, accordingly as the line joining the pivotal centres of the sockets 42 and 43 is inclined to the right or to the left respectively of the line joining the pivotal centre of the socket 43 with the axis of the shaft 40. The latter line for convenience of description will be hereinafter termed "the central position."

It will further be understood that the movement of the pawl 37 in the direction indicated in Fig. 9 will place the pawls 37 in a position for engagement by the teeth 36 on the crosshead 35 as the latter in reciprocating moves to the right.

As a consequence of the engagement of the pawls 37 with the teeth 36, the former through the medium of the pivot shafts 40 move the carriage 8 and therewith the angular impaling blade 5 and the fruit 1 thereon from the normal impaling position shown in Figs. 1 and 5 to the pick-up position best seen in Figs. 2, 6 and 11, whereat the fruit is engaged by vacuum cups and held thereby for processing as hereinafter described.

The safety means whereby the engagement of the pawls 37 with the teeth 36, with consequent movement of the carriage 8, angular blade 5 and fruit 1 thereon, is prevented until the operative's hands are well clear of the carriage and blade will now be described.

Extending from the sleeves or bosses 38 of the pawls 37 are angular lugs 46 adapted for engagement with tripping lugs 47 integral with sleeves 48 pivotally supported on shafts 50 fixed in upwardly extended pillars 51 of arms 52 and 53 which are curved inwardly and upturned at the free ends 54 to lie between slotted posts 55 having therein longitudinal slots 56 through which and through the ends 54 are passed bolts 57.

It will be apparent that upon loosening the bolts 57 the posts 55 may be adjusted upwardly or downwardly relatively to the ends 54 and secured to the latter in adjusted positions upon re-tightening the bolts 57.

The posts 55 are interconnected by lugs 58 through which are threaded adjusting screws 59 which at the upper ends engage lugs 60 projecting from arms 61 pivoted at 62 upon the posts 55 and carrying arm plates 63.

Figure 6:
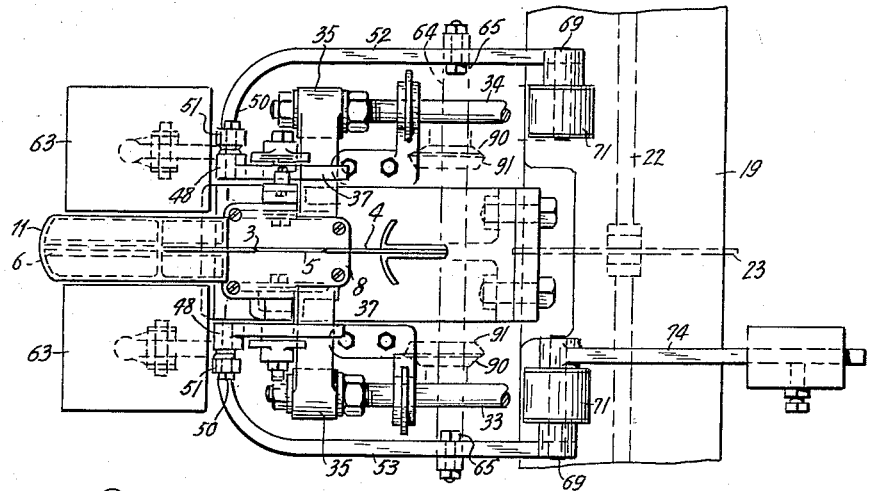

The arms 52 and 53 near their pivotal supports are interconnected by a bracing bar or member 64, see particularly Figs. 5 and 6, and said arms are secured to shafts 69 extending through bearing housings 71 integral with and extending above the bearings 28 and 29. The housings 71 are preferably fitted with anti-friction bearings to provide a minimum frictional resistance to rotary or angular movements of the shafts 69 and pivotal movements of the arms 52 and 53 and corresponding substantially vertical movements of the arm plates 63.

To the inner end of one of the shafts 69, there is attached an arm 74 whereon is slidably mounted a counterweight 75 which is secured in an adjusted position upon the arm 74 by a clamping screw 76. The counterweight 75 is adjusted to overbalance the arms 52 and 53 so that these arms are constantly urged in an upward direction about their pivotal supports, namely, the shafts 69 and bearings 71.

In impaling the peach upon the movable blade 5, the operative's fore-arms or wrists engage and depress the arm plates 63 thereby angularly displacing the arms 52 and 53 in a downward direction and moving therewith the pillars 51, shafts 50, sleeves 48 and tripping lugs 47.

The downward movement of each sleeve 48 displaces the tripping lug 47 from the position shown by full lines in Fig. 8 wherein said lug is normally maintained by contact of a projection 70 on the sleeve 48 with a stop 72 on the pillar 51 under influence of a torsion spring 73.

In being so displaced, the tripping lug 47 bears upon the angular lug 46 on the sleeve 38 and partially rotates the latter and the pawl 37 which is maintained in an elevated position by the snap-over spring 41. The tripping lug 47 is thus displaced into the position indicated by dotted lines in Fig. 8, but upon disengagement from the angular lug 46, the tripping lug 47 and the sleeve 48 are immediately returned to the normal position by the torsion spring 73.

Although the actions of the lugs 46 and 47 and pawl 37 associated with the arm 52 have been described with reference to Fig. 8, it will be understood that precisely similar actions occur simultaneously in the corresponding lugs 46 and 47 and pawl 37 associated with the arm 53.

Accordingly, when the arms 52 and 53 are depressed as described by the operative, both pawls 37 are maintained in elevated positions clear of the reciprocating teeth or catches 36, so that the carriage 8, the impaling blade 5 with the peach 1 thereon remain at the impaling position or station while the rods 33 and 34, the crosshead 35 and the teeth or catches 36 continuously reciprocate.

Upon impalement of the peach and removal of the operative's arms from the plates 63, the counterweight 75 elevates the arms 52 and 53 and accordingly raises the tripping lugs 47, which being maintained firmly in the normal position by the co-operation of the spring 73 and stop 72, engage the underside of the angular lugs 46, see Fig. 9, and thereby partially rotate the sleeves 38 upon the shafts 40. The partial rotation of the sleeves 38 displaces the snap-over springs 41 from the left of the central position, Fig. 8, to the right of this position, Fig. 9, so that said springs become effective to impel the pawls 37 into positions for engagement by the reciprocating teeth 36.

The cross head 35 and the teeth 36 may be at any point of the forward or return stroke when the pawls 37 are impelled into the engaging position, but it will be understood that the teeth 36 will raise and move idly beneath the pawls in passing by the same on the latter stroke but will engage the pawls upon the next forward stroke.

Upon engagement of the pawls 37 with the teeth 36, see Fig. 5, the carriage 8, the impaling blade 5 and therewith the peach 1 are moved from the impaling position to the "pick-up" position, whereat the peach is located between a pair of relatively movable vacuum cups, the construction and operation of which will be described later herein.

It will be apparent that if the pawls 37 after thus transferring the peach to the pick-up position, remained in engagement with the teeth 36, the carriage 8 and the impaling blade 5 under the alternate thrust of the crosshead 35 and pull of the teeth 36 would reciprocate.

It therefore is necessary to release the pawls 37 after transference of the peach to the pick-up position.

Figure 7:
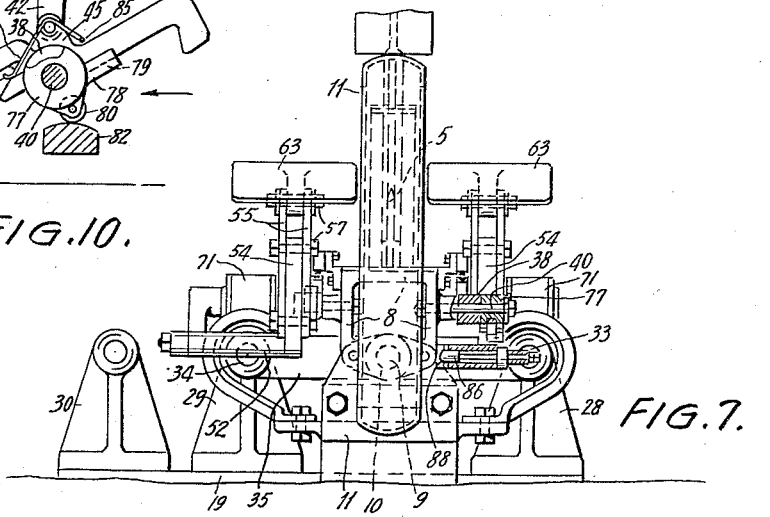
Fig. 7 is a front elevation, partly sectional, of the feeding mechanism.

For the purpose of releasing the pawls 37 from the teeth 36, a sleeve 77 is rotatably mounted upon each shaft 40 side by side with the sleeve 38, see Fig. 7, and particularly Figs. 8, 9 and 10, wherein the former sleeve is partly broken away to show the latter sleeve.

Extending from each sleeve 77 is an integral lug 78 and projecting from the latter is a finger 79 which extends beneath the pawl 37. Also carried by the sleeve 77 is a roller 80 which is positioned so as to contact with fixed cam 82 as the carriage 8 is moved forwardly by engagement of the pawls 37 with the crosshead teeth 36.

The engagement of the cams 82 by the rollers 80 partially rotates the sleeves 77 on the shafts 40 and by means of the fingers 79 elevates the pawls 37 sufficiently to move the springs 41 to the left of the central position, whereupon said springs raise the pawls clear of the teeth 36, so that upon the carriage being thrust by the crosshead 35 back to the impaling position, the former will remain in this position as the latter moves forwardly on the next stroke.

Each finger 79 is maintained normally in contact with the underside of the corresponding pawl by means of a spring 81 one end 83 of which is engaged with a lug 84 while the opposite end 85 bears upon the pawl 37, see Fig. 10.

The carriage 8 and the impaling blade are retained in the impaling position by engagement of a stationary index pin 86 which is spring influenced to engage a recess 88 in the carriage 8 when the latter is returned to the impaling position but is readily released from the recess as the carriage is again moved forwardly, see Fig. 7.

In feeding a peach to the impaling blade, the operative gripping the peach with both hands moves the same downwardly, and in doing so depresses the arm plates 63. Upon removal of the operative's arms from the plates 63 and just as the same return to the normal position, the pawls 37 are moved by the tripping lugs 47 into position for engagement with the crosshead teeth 36 whereupon the peach is carried to the pick-up position as described.

Accordingly, it will be apparent that no movement of the carriage 8 can occur until the operative's hands are well clear of the impaling blade 5. Moreover, an extension 89, see Figs. 1 and 5, of the bracket 6 bridges the gap 2 between the fixed impaling blades 3 and 4 during the complete reciprocatory movement of the carriage, so that it is not possible for the operative to insert a peach while the impaling blade 5 is in motion.

It will therefore be apparent that each successive peach can only be fed in by the operative after the carriage 8 and the impaling blade 5 are returned to and are stationary at the impaling position, and that the operation of the carriage and impaling blade following upon the impalement of each peach is quite independent of action by the operative, who is accordingly guarded against injury.

The vacuum or suction cups 90 for gripping fruit at the pick-up position are provided with flexible mouth pieces 91 for engagement with fruit, and are supported for universal movement for seating upon the surfaces of fruit of different shapes and sizes and are also provided with vacuum operated locking means to maintain the hold on fruit during subsequent processing, all substantially as described in the complete specification of our co-pending United States application, Serial No. 709,713, which became Patent No. 2,518,274 on August 8, 1950.

The functions of the suction cups are:

(a) To pick up and hold any fruit within the range of usual size and shape.

(b) To maintain a grip upon the fruit during processing operations performed subsequently to the picking-up and until the fruit is pitted and in readiness for discharge.

The suction cups 90 are arranged as a coaxially aligned opposed pair, and are positioned on opposite sides of the line of travel of the impaling blade 5, the oppositely located suction cup assemblies being similar and adapted to operate simultaneously.

Referring to Fig. 14 illustrating in section one of the suction cup assemblies, 92 indicates a slidably mounted reciprocable rod whereby the assembly is moved to carry fruit from the pick-up position to the pitting stations as presently described.

The rod 92 is secured to a cylindrical sleeve 93 which fits over a cylindrical body 94 with which is formed integrally an inner arm 95.

The body 94 projects outwardly from the sleeve 93 and is somewhat reduced to fit within a collar 96 which is secured against rotation on the cylindrical body 94 by a key 97 and has integrally formed therewith an outer arm 98. Also integral with the collar 96 is an arm 99 which carries a cam follower or roller 100.

Extending through and slidable within coaxially aligned apertures 101 in the inner and outer arms 95 and 98 is a supporting shaft 102 which at the inner end is secured by threaded engagement to a boss 103 at the upper end of an extension 104 of an arm 105.

It will be apparent that the cylindrical body 94, arms 95 and 98, supporting shaft 102, arm 105 and the suction cup 90 and operative elements associated with said cup are rotatably supported by the cylindrical sleeve 93, and it will further be apparent that any movement of the cam roller 100 in following a cam track will be correspondingly imparted to the cylindrical body 94, and to said parts supported by said body.

The arm 105 is integral with a shaft 106 which extends axially through and is slidable within the cylindrical body 94. The outer end of the shaft 106 is provided with lock nuts 107 between which and the outer end of the body 94 is interposed a spring 108 which by exerting pressure upon the lock nuts maintain the arm 105 in a normal position contiguous with the inner end of the body 94 and the arm 95 thereon.

The shaft 106 is formed with an axial hole or bore 109 to accommodate a plunger 110 and a spring 111 interposed between the inner end of the axial bore 109 and the plunger 110 which latter is provided with an extension or push rod 112 having at the end a cap or button 113.

Upon arrival of the peach at the pick-up position the carriage 8 and the impaling blade 5 remain stationary for a predetermined period during which the push rods 112 of the opposed suction cup assemblies are thrust simultaneously inwards, as hereinafter described.

The springs 111 are of greater strength and have greater resistance to compression than the springs 108, and resultantly the shafts 106 and arms 105 are thrust inwardly by the push rods 112 and plungers 110, the springs 108 being compressed to a greater degree than the stiffer springs 111. The inward movement of the shafts 106 and arms 105 engages the suction cups 90 with the peach, and the flexible mouth pieces 91 seat upon opposite sides of and accommodate themselves to the surface or contour of the peach. The extent of compression of the stiffer springs is dependent upon the size of the fruit to be picked up, these springs being obviously subjected to more compression with fruit of greater size. Accordingly, the springs 111 by their compression enable the suction cups to pick up all sizes of fruit with the normal range of size.

Upon sealed engagement of the suction cups 90 with the peach being effected, the free inflow of air suctionally drawn into the mouth pieces 91 ceases and a vacuum is formed within the suction cups whereby the flexible mouth pieces firmly grip the peach; and at the same time the suction cups are locked in their engaged positions.

Upon the peach being thus gripped by the suction cups 90, each cup assembly is drawn by the corresponding rod 92 from the pick-up position.

After departure from the pick-up position, the plungers 110 and the push rods 112 under influence of the springs 111, return to their normal positions, but the springs 108 are of insufficient strength to release the vacuum cups which accordingly retain by suction a firm grip upon the opposite sides of the peach and carry the latter as the cup assemblies are drawn by the rods 92 to the rotating saws 23 and 24.

The suction cups 90 maintain their grip upon opposite sides of the peach during the sawing of the latter, and provided that the peach has been properly impaled, the sawing will take place in the natural suture plane of the peach. Moreover, as the impaling blade is close to the saws in the pick-up position, the peach is pulled from the impaling blade directly into the saws 23—24 without deviating from the natural suture plane.

Upon halving of the peach by the saws, the tensioned springs 108 retract the shafts 106, the arms 105 and the suction cups 90 to the normal position. The vacuum is maintained in each suction cup so that the half peach carried thereby remains securely held in being traversed to and pitted at the respective pitting station.

Figure 2:
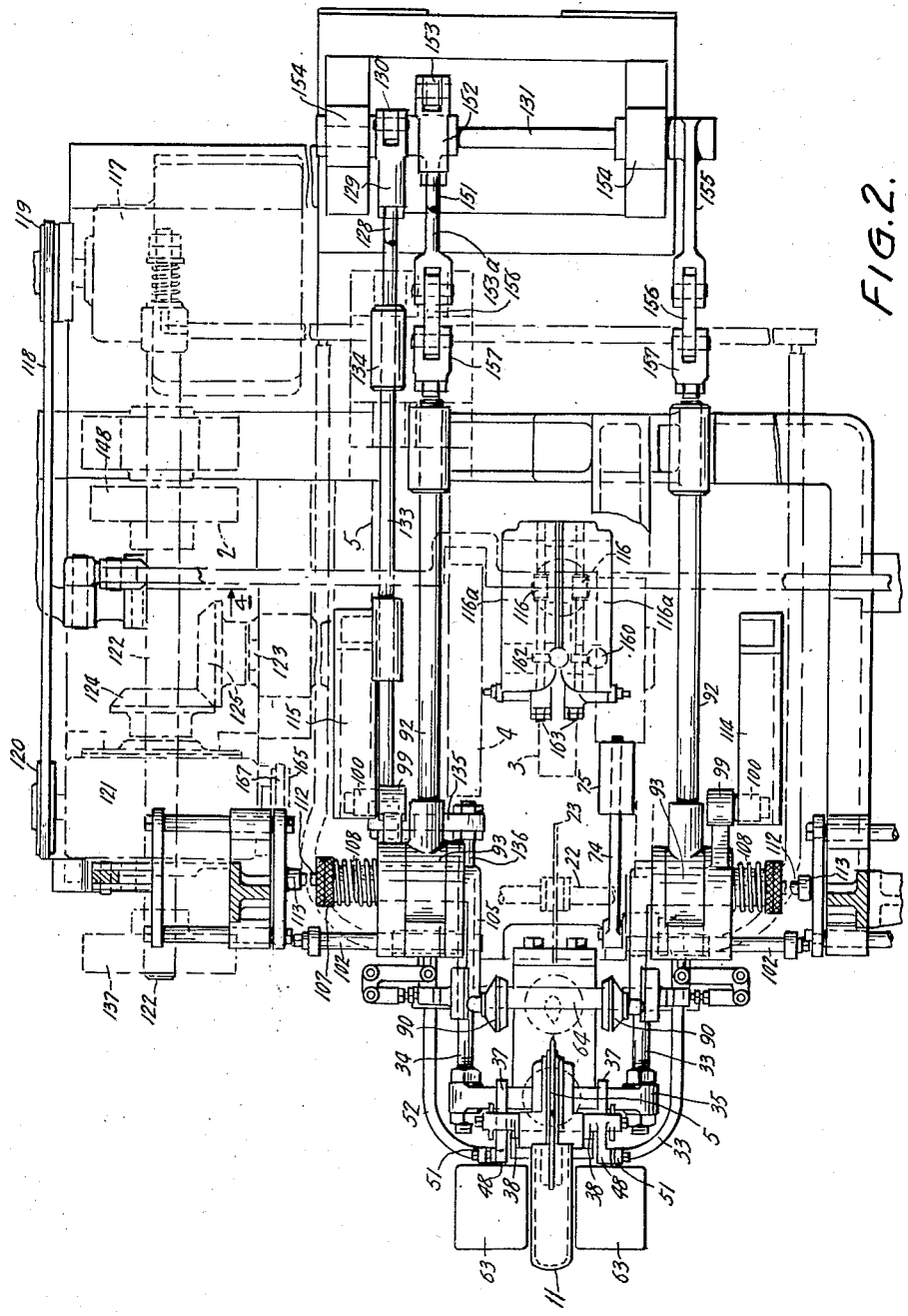
Fig. 2 is a plan view of the machine shown in Fig. 1.

Attention being directed more particularly to Figs. 1, 2 and 11, it will be noted that the cam rollers 100 are located at the outer ends of the horizontal portions 114a—115a of two fixed cam tracks 114 and 115 when the suction cups 90 are located in the pick-up position.

As the suction cup assemblies are advanced by the rods 92, the rollers 100 traverse the horizontal portions 114a—115a of the cam tracks 114 and 115 which being parallel to the line of travel of the two cup assemblies merely function as guides for the rollers and have no effect in diverting the latter either upwardly or downwardly.

At the further ends, the cam tracks 114—115 are formed with upward and downward extensions 114b—115b respectively, the junctions of these extensions with the horizontal portions 114a—115a being appropriately radiused as shown.

As the rollers 100 arrive at these radiused junctions, they commence to be diverted from their rectilinear courses, and upon entering and moving upwardly and downwardly respectively in the extensions 114b—115b, said rollers by means of the arms 99 rotate the cylindrical bodies 94 in the sleeves 93 and displace the respective suction cup assemblies through angles of approximately ninety degrees.

It will accordingly be apparent that the half peach carried by the suction cup assembly associated with the cam track 114 will be displaced in a downward direction, whereas the suction cup assembly associated with the cam track 115 will be displaced upwardly, the courses of the suction cups 90 and peach halves being indicated by the curves shown in Fig. 13.

By these upward and downward displacements the respective suction cups and half peaches held thereby, are brought into alignment with pitting stations, displosed one above the other in vertical arrangement.

When thus aligned with the respective pitting stations, the push rods 112 are thrust as previously described to impel the suction cups 90 and peach sections inwardly to the pitting tables 116a whereat the halved stones or pits are extracted by pitting blades 116 preferably of the kind described and illustrated in the complete specification of my co-pending United States Application Serial No. 666,986 which became Patent No. 2,489,612 on November 29, 1949.

The suction cups 90 dwell at the pitting stations for a predetermined period sufficient to ensure removal of the pits, and are then drawn outwardly upon release of the push rods 112 by the springs 108, whereupon the vacuum in the suction cups is broken down to release the pitted half peaches from the suctional grip of the former for discharge from the machine for further processing and canning. The suction cup assemblies are then returned to the pick-up position to engage the next peach which meanwhile has been impaled upon the blade 5 by the operative and traversed to the pick-up position as previously described herein.

For the purpose of operating the machine, there is an electric motor 117 which through the medium of belting 118 and pulleys 119—120 is operatively connected with a gear box 121 having projecting therefrom an output shaft 122 which is driven at an appropriately reduced speed and is drive connected with a transverse cam shaft 123 through bevel gears 124—125.

Secured to the cam shaft 123 is a cam 126 which through a follower or roller 127, guided rod 128 and link 129, see Fig. 2, is operatively connected with a vertically disposed lever or rocker 130 which is pivotally supported on a shaft 131 and at the lower end is connected by a link 132 with a reciprocally mounted rod 133.

The rod 133 at the rear end is slidably supported in a bearing 134 and at the front end in the bearing 30, see Fig. 3, and said rod is connected by a crosshead 135 and rod 136 with the crosshead 35, see Fig. 2.

It will be apparent that the cam 126 through the medium of the roller 127, rod 128, link 129, rocking lever 130 and link 132, reciprocates the slidable rod 135 which through the crosshead 135 and rod 136 reciprocates the crosshead 35 and the carriage 8 and impaling blade 5 when the same are connected to the latter crosshead by the pawls 37 as previously described.

The cam 126 is appropriately profiled to provide the required dwell of the impaling blade 5 and the peach thereon to enable the suction cups 90 to engage and grip the peach at the pick-up position.

Secured to the shaft 122 is a cam 137, which through a guided roller 138 and link 139 is connected to a pivotally supported rocking lever 140, which through intermeshed sector racks 141—142 is connected to a second rocking lever 143.

The lever 143 is link connected with a slidably mounted thrust rod 144 which is coaxially aligned with the push rod 112 of the left hand suction cup assembly. The lever 140 has an arm 145 which through a tie rod 146 is connected with a lever 147 pivotally supported at the right hand side of the machine and link connected to a thrust rod 144 in coaxial alignment with push rod 112 adapted to actuate the right hand suction cup assembly.

It will be understood that the cam 137 through the levers 140—143, and the interlinked lever 147, will simultaneously actuate the push rods 112 of the two opposed suction cup assemblies for engagement with a peach at the pick-up position.

Another similar leverage system and associated thrust rods actuated by a cam 148, see Figs. 1 and 4, is provided to actuate the push rods 112 of the suction cup assemblies at the pitting positions.

Also secured to the cam shaft 123 is a cam 149 which through a roller 150, guided rod 151 carrying the roller and a link 152 is operatively connected with a lever 153 secured to the shaft 131 which is rotatably supported by bearings 154.

Secured to the shaft 131 is an arm 155 equal in length to the longer arm 153a of the lever 153, see Fig. 2, and the former and latter arms are connected by links 156 to forked or clevis ends 157 secured to the slidable rods 92 which as previously described, traverse the suction cup assemblies to and fro between the pick-up position and the pitting stations.

The cam 149 is appropriately profiled to reciprocate the rods 92 and provide the necessary dwell of the suction cup assemblies at the pick-up and pitting positions as will be readily understood.

A further cam 158 secured to the cam shaft 123 through the medium of roller 159, vertically slidable rack bar 160, racks 161 and pinions 162, oscillates the pinion shafts 163 and the pitting blades 116 secured thereto.

For the purpose of driving the saws 23 and 24 the input shaft 164 of the gear box 121 is operatively connected by pulleys 165—166 and belting 167 with the shaft 22 of the upper saw 23 which rotatably carries a gear 168 meshed with a gear 169 fixed to the shaft 21 of the lower saw 24.

The electric motor 117 also drives a suitable vacuum pump (not shown) whereby the suction cups 90 are evacuated to grip the fruit, the actions of the suction cups being controlled by rotary valves of the type described and illustrated in our co-pending United States Application Serial No. 709,713 which became Patent No. 2,518,274 on August 8, 1950, and driven by the electric motor at required speeds.

We claim:

1. A fruit pitting machine comprising a pair of slitting saws, pitting means disposed at upper and lower positions, a carriage reciprocal between a feeding position and a pick-up position, an impaling blade mounted on the carriage whereon fruit is impaled with the suture plane coincident with the plane of said blade while said carriage remains stationary at the feeding position, a slidably mounted continuously reciprocated crosshead engageable with the stationary carriage to move the latter and the impaling blade with the fruit thereon from the feeding position to a pick-up position and return said carriage and blade to the feeding position, suction cups engageable with the fruit at the pick-up position and movable rectilinearly to convey the whole fruit from the impaling blade to the slitting saws for halving in the suture plane and movable angularly to carry the fruit halves respectively to the upper and lower pitting means, releasable coupling means for operatively connecting the reciprocal carriage with the crosshead, and depressible members at the feeding position pivotally supported on opposite sides of the plane of the impaling blade and displaceable by the arms of an operative in impaling fruit on said blade to actuate the releasable coupling means to interconnect the reciprocal carriage and the crosshead.

2. A fruit pitting machine according to claim 1 wherein the impaling blade is of angular formation, horizontal and vertical blade portions on the angular impaling blade, vertically disposed fixed blades positioned above and coplanar with the angular impaling blade and spaced apart by a gap through which fruit is impelled in being impaled on the angular impaling blade, and a guard adapted to close said gap when the angular impaling blade is in motion.

3. A fruit pitting machine according to claim 1 wherein each suction cup is mounted upon conveyor means comprising a hollow member reciprocal in a rectilinear course, a body member rotatably fitted in said hollow member, a shaft extending axially through and slidable within the body member, springs opposing axial movement of the shaft, an arm extending from the shaft and carrying the suction cup, cam means responsive to rectilinear motion of said hollow member to angularly move the body member and the shaft and said arm and suction cup, and thrusting means operable to move said shaft and said arm and suction laterally to the rectilinear course of the hollow member against resistance of said springs.

4. A fruit pitting machine according to claim 1 wherein the movable impaling blade and the slitting saws and the pitting means are disposed in a common plane and the suction cups are mounted upon separate conveyors disposed in alignment on opposite sides of the common plane, said conveyors comprising hollow members reciprocal in unison in a rectilinear course, body members rotatably fitted in said hollow members, shafts extending axially through and slidable within the body members, springs opposing axial movements of the shafts, coplanar arms extending from the shafts and carrying the suction cups in transverse alignment on opposite sides of the common plane, fixed cam tracks disposed on opposite sides of and parallel with said common plane, cam followers on the body members engaging the fixed cam tracks, sections of the cam tracks parallel with said rectilnear course and comprising guides for the cam followers, sections of the cam tracks at right angles to the rectilinear course and coactive with the cam followers to angularly move the suction cups respectively to and from the upper and lower pitting means, and cam-actuated thrusting means synchronously operable to move said shafts, coplanar arms and suction cups inwardly in relation to said common plane at the pick-up position and at the upper and lower positions of the pitting means.

5. A fruit pitting machine as claimed in claim 1 wherein the coupling means comprises at least one catch member on the slidably mounted crosshead and a movable connecting element mounted on the reciprocal carriage and releasably engageable with the catch member.

6. A fruit pitting machine as claimed in claim 1 wherein the depressible members are carried by pivoted arms, catches on the slidably mounted crosshead, pawls on the reciprocal carriage engageable with the catches, snap-over means mounted on the reciprocal carriage and retaining the pawls retracted from the catches, tripping means carried by the pivoted arms and operable to actuate the snap-over means to position said pawls for engagement by said catches, and means for releasing the pawls from the catches.

7. A fruit pitting machine as claimed in claim 1 wherein the depressible members are carried by pivoted arms, counter-balance means maintaining the pivoted arms and the depressible members in a normal position, teeth on the slidably mounted crosshead, pawls pivoted on the reciprocal carriage and engageable with the teeth on the crosshead, spring snap-over means associated with the pawls and operable to locate said pawls in operative and inoperative positions, spring-influenced sleeves on the pivoted arms, tripping lugs on the spring-influenced sleeves, coactive lugs on the pawls engageable with the tripping lugs and operable by the latter lugs to actuate the pawls for engagement by said teeth, and cam-actuated disengaging means to automatically release the pawls from said teeth.

8. In a fruit processing machine, mechanism for traversing a fruit from a feeding position to a pick-up position at which the fruit is received for treatment, said mechanism comprising a fruit carrier movable from the feeding position to the pick-up position and normally stationary at the former position, a member constantly reciprocating between the feeding and pick-up positions, catch means on the constantly reciprocating member, latching means on the movable fruit carrier normally located out of the line of movement of the catch means, and tripping means movable from a normal position responsive to manual placement of the fruit upon the fruit carrier and operable during return to the normal position to locate the latching means for engagement by the catch means.

9. In a fruit processing machine, mechanism for traversing a fruit from a feeding position to a pick-up position comprising a reciprocable fruit carrier guided for movement from the feeding position to the pick-up position and normally retained at the former position, an impaling blade for support of the fruit on the reciprocable fruit carrier, a member constantly reciprocating between the feeding and pick-up positions and guided for movement parallel with the reciprocable fruit carrier, projecting teeth on the constantly reciprocating member, resilient latches on the reciprocable fruit carrier normally out of the line of movement of the projecting teeth, a depressible member movable from a normal position responsive to manual placement of the fruit upon the impaling blade, restoring means opposing movements of the depressible member, tripping elements mounted upon the depressible member and operable during return of the latter by the restoring means to position the resilient latches for engagement by the projecting teeth, and releasing means engageable by the resilient latches and operable to disconnect the latter from the projecting teeth.

10. In a fruit processing machine, mechanism for traversing a fruit from a feeding position to a pick-up position, comprising a reciprocable carriage guided for rectilinear movement from the feeding position to the pick-up position and normally stationed at the former position, an impaling blade for support of the fruit on the reciprocable carriage, a slidably mounted member constantly reciprocating between the feeding and pick-up positions and guided for rectilinear movement parallel with the reciprocable carriage, projecting teeth on the constantly reciprocating member, spring - influenced snap - over pawls pivoted on the reciprocable carriage and normally out of the line of movement of the projecting teeth, a depressible lever movable from a normal position responsive to manual placement of the fruit upon the impaling blade, a counterweight opposing movement of the depressible lever and maintaining the latter in the normal position, tripping devices mounted upon the depressible lever and operable during return of the latter by the counterweight to actuate the snap-over pawls for engagement by the projecting teeth to couple the reciprocable carriage with the constantly reciprocating member for movement of the former from the feeding position to the pick-up position, disengaging devices coaxially pivoted with the snap-over pawls, and fixed cams operating the disengaging devices during reverse movement of the carriage to release the pawls from the projecting teeth.

11. Mechanism for traversing a fruit from a feeding position to a pick-up position according to claim 10, having a right angled impaling blade, fixed blades spaced apart in the plane of the right angled impaling blade separated by a gap for insertion of the fruit and comprising guides for the fruit in impalement on the right angled blade, adjustable plates carried by the depressible lever on opposite sides of the common plane of the spaced fixed blades and the right angled blade and engageable by the arms of an operative in impaling a fruit, and a safety shield carried by the reciprocable carriage and covering the gap between the fixed blades during reciprocation of said carriage.

12. A fruit pitting machine comprising a fruit carrier guided for reciprocation between a feeding position and a pick-up position, a fruit splitting means co-planar with the fruit carrier, separate pitting devices located at spaced positions in the common plane of the fruit carrier and fruit splitting means, a member continuously reciprocated parallelly with the common plane between the feeding and pick-up positions, catch means on the continuously reciprocated member, latching means on the movable fruit carrier normally located out of the line of movement of the catch means, tripping means movable from a normal position responsive to manual placement of a fruit upon the fruit carrier and operable during return to the normal position to locate the latching means for engagement by the catch means for movement of the fruit carrier and the fruit to the pick-up position, gripping devices engageable with the fruit at the pick-up position, reciprico-rotary means supporting the gripping devices, and guideways coactive with the reciprico-rotary means for rectilinear movement of the gripping devices and the whole fruit from the pick-up position to the splitting means and angular movement of the gripping devices and the halved fruit to the separate pitting devices.

13. A fruit pitting machine as claimed in claim 12, wherein the reciprico-rotary means comprise a pair of units disposed respectively on each side of the common plane of the fruit carrier, the fruit splitting means and the spaced separate pitting means, each reciprico-rotary unit comprising a reciprocable sleeve, a cylindrical body rotatably fitting within the reciprocable body, an arm rotatable with the cylindrical body and carrying a fruit gripping device, an arm secured to the cylindrical body and carrying a cam follower, and a cam track engaged by the cam follower.

ARNOLD BESAG.
JAMES SHELDON MOSS.

REFERENCES CITED

The following references are of record in the file of this patent:

UNITED STATES PATENTS

| Number | Name | Date |
|---|---|---|
| Re. 16,259 | Duncan | Feb. 9, 1926 |
| 1,263,742 | Chase | Apr. 23, 1918 |
| 1,403,852 | Ensele | Jan. 17, 1922 |
| 1,785,020 | Whipple | Dec. 16, 1930 |
| 2,108,535 | Jepson | Feb. 15, 1938 |
| 2,257,341 | Jepson | Sept. 30, 1941 |
| 2,336,123 | Perrelli et al. | Dec. 7, 1943 |